United States Patent
Lam et al.

(10) Patent No.: US 10,520,610 B2
(45) Date of Patent: Dec. 31, 2019

(54) HIGH-PERFORMANCE COMPOSITE SCINTILLATOR

(71) Applicant: CapeSym, Inc., Natick, MA (US)

(72) Inventors: Stephanie Lam, Newton, MA (US); John C. Fiala, Natick, MA (US); Shariar Motakef, Weston, MA (US)

(73) Assignee: CapeSym, Inc., Natick, MA (US)

( * ) Notice: Subject to any disclaimer, the term of this patent is extended or adjusted under 35 U.S.C. 154(b) by 0 days.

(21) Appl. No.: 15/841,636

(22) Filed: Dec. 14, 2017

(65) Prior Publication Data

US 2018/0172846 A1 Jun. 21, 2018

Related U.S. Application Data

(60) Provisional application No. 62/434,708, filed on Dec. 15, 2016.

(51) Int. Cl.
*G01T 1/20* (2006.01)

(52) U.S. Cl.
CPC .......... *G01T 1/2018* (2013.01); *G01T 1/2002* (2013.01); *G01T 1/2008* (2013.01)

(58) Field of Classification Search
CPC ............ G01T 1/203; G01T 3/06; G01T 1/202
See application file for complete search history.

(56) References Cited

U.S. PATENT DOCUMENTS

| 2006/0054863 | A1 | 3/2006 | Dai et al. | |
|---|---|---|---|---|
| 2011/0293231 | A1* | 12/2011 | van Bommel | G02B 6/06 385/120 |
| 2012/0161011 | A1* | 6/2012 | Menge | G01T 1/2002 250/361 R |
| 2013/0020488 | A1* | 1/2013 | Flamanc | G01T 1/20 250/362 |
| 2013/0075848 | A1 | 3/2013 | Nikolic et al. | |
| 2014/0112432 | A1 | 4/2014 | Thalhammer et al. | |
| 2014/0332689 | A1 | 11/2014 | Van Loef et al. | |
| 2015/0323683 | A1* | 11/2015 | Vasilyev | G01V 5/107 250/269.1 |
| 2016/0102247 | A1* | 4/2016 | Cherepy | G01T 3/06 250/361 R |
| 2016/0266260 | A1* | 9/2016 | Preston | G01T 1/02 |

OTHER PUBLICATIONS

"Composite Neutron Gamma Detector" Nuclear Science Symposium and Medical Imaging Conference (NSS/MIC), 2015 IEEE (2015), p. 1-3 to Shah et al. (hereinafter "Shah").*

"Optimizing light transport in scintillation crystals for time-of-flight PET: an experimental and optical Monte Carlo simulation study", Biomed Opt Express (2015), available at: https://www.ncbi.nlm.nih.gov/pmc/articles/PMC4473755/ to Berg et al.*

(Continued)

*Primary Examiner* — Kenneth J Malkowski
(74) *Attorney, Agent, or Firm* — Modern Times Legal; Robert J. Sayre

(57) ABSTRACT

A composite scintillator includes a matrix material and pieces of at least one scintillator material embedded in the matrix material. The scintillator material is (a) inorganic single-crystalline or ceramic, (b) organic plastic, or (c) glassy; and the embedded scintillator material scintillates in response to at least one of gamma-ray and neutron irradiation.

19 Claims, 6 Drawing Sheets

(56) References Cited

OTHER PUBLICATIONS

"Scintillation Particle Detectors Based on Plastic Optical Fibres and Microfluidics", Mapelli, École Polytechnique Fédérale De Lausanne, p. 1-167 (2011) to Mapelli.*

K. Shah, et al., "New Detectors for Gamma and Neutron Studies," DOE SBIR Phase II presentation <https://science.energy.gov/~/media/np/pdf/sbir%20sttr/presentations/shah_np_gamma_neutron_scintillators_1_pdf> (2010).

United States Patent and Trademark Office, International Search Report and Written Opinion for PCT/US17/66303 (corresponding PCT application) (dated Mar. 1, 2018).

* cited by examiner

HIGH-PERFORMANCE COMPOSITE SCINTILLATOR

RELATED APPLICATION

This application claims the benefit of U.S. Provisional Application No. 62/434,708, filed 15 Dec. 2017, the entire content of which is incorporated herein by reference.

GOVERNMENT SUPPORT

This invention was made with government support under Grant No. HSHQN-16-C-00013 awarded by the US Department of Homeland Security, Domestic Nuclear Detection Organization. The Government has certain rights in the invention.

BACKGROUND

The detection of radioactive materials typically requires the measurement of their emitted gamma rays and/or neutrons. The emission energy is a unique signature of the radioactive material and, therefore, serves as a means of identification. Scintillator materials are a class of materials that respond to radiation through the following mechanism: (1) impinging radiation leads to ionization of atoms (of which the scintillator material is comprised) to produce electrons and holes; (2) the electrons and holes thermalize and migrate to luminescent centers; and (3) the electrons and holes recombine to produce visible photons. When scintillators are coupled to a photodetector, such as a photomultiplier tube (PMT), silicon photomultiplier (SiPM), or silicon avalanche photodiode (APD), the emitted photons are converted into electrical pulses, which can then be analyzed to detect the presence of or to determine the identity of the radiation source. Scintillator materials have been used in a variety of fields, including homeland security, high-energy physics, medical imaging, and oil-well logging.

One measure of a scintillator's performance is its energy resolution (ER), a metric on the precision with which it can resolve different energy levels. Energy resolution is determined from the photopeak of the pulse-height spectrum generated when a scintillator responds to irradiation. ER is determined by taking the quotient of the full-width at half-maximum (FWHM) and the centroid of the photopeak. High-performance scintillators have high ERs, corresponding to low numerical values of the aforementioned quotient. Another measure of scintillator performance is its ability to distinguish between gamma radiation and neutron radiation. The figure-of-merit (FOM) characterizing this attribute is determined by integrating the neutron and gamma-ray output signal traces from the photodetector using two integration windows (fast and slow). A ratio of the integrals is plotted versus the energy, and a slice containing both the gamma-ray and neutron features is projected to produce two Gaussian-like peaks. The FOM is then calculated by dividing the separation between the peak centroids by the sum of their FWHMs. The typical requirement for adequate gamma-ray/neutron discrimination is an FOM value of 1.5 or greater.

SUMMARY

A composite scintillator and methods for its fabrication and use are described herein, where various embodiments of the apparatus and methods may include some or all of the elements, features and steps described below.

The composite scintillators can be used for the detection of gamma-ray and neutron radiation, where the neutrons can be fast or thermalized neutrons. Composite scintillators (CS) provide the opportunity to produce large detectors with tailorable properties. They can comprise (a) a matrix material, M [typically an organic composition, such as polyvinyltoluene (PVT), polymethyl methacrylate (PMMA), and polystyrene (PS), or a silicone-based composition, such as polydimethylsiloxane (PDMS) with fluorophores and/or $^6$Li additives] that may or may not experience ionization and subsequent scintillation in response to gamma-ray and/or neutron irradiation; (b) a second material, A, which is a single-crystal scintillator or glassy material, that does experience ionization and subsequent scintillation in response to irradiation by gamma-ray and/or neutron irradiation; and (c) a third material, B, which is a single-crystal scintillator or glassy material, that does experience ionization and subsequent scintillation in response to irradiation by gamma-ray and/or neutron irradiation, and its response to radiation is different from that of material A. Examples of materials A and B are Ce-doped, $^6$Li enriched $Cs_2LiYCl_6$ (CLYC(Ce), CLYC) or a $^6$Li-enriched glassy material.

The photons emitted from the composite scintillator in response to radiation reflect the ionization and scintillation process in M (if M is responsive to neutron/gamma-ray irradiation); the ionization and scintillation process in A and/or B; and possibly, a wavelength shifting phenomenon in M, in which most or all of the photons from A and/or B are absorbed by the fluorophores in M, followed by a re-emission of the absorbed energy at longer wavelengths. Depending on the properties of M, A and/or B, and the fabrication process, the pulse-height spectrum of the photons emitted by the composite scintillator may not exhibit a photopeak that is related uniquely to the energy of the incoming radiation. In such cases, the photons from the composite scintillator are related only to the ionization events in M, A and B; and the composite scintillator is generically referred to as a "counter" (i.e., it counts the number of ionization events). In cases where a gamma-related photopeak is observed, the performance metric is the energy resolution (ER) of the photopeak. In cases where the composite scintillator responds to both gamma-ray and neutron irradiation, the performance metrics include both the ER of the photopeak and the aforementioned FOM. The discussion, below, describes a method for selecting materials M, A and B; their geometries, and matching of emission and absorption spectra such that the ER and/or FOM of the composite scintillator becomes very close to or better than that of materials A or B.

In various embodiments, the composite scintillator includes a matrix material and pieces of at least one scintillator material embedded in the matrix material. The scintillator material is (a) inorganic single-crystalline or ceramic, (b) organic plastic, or (c) glassy; and the embedded scintillator material scintillates in response to at least one of gamma-ray and neutron irradiation.

In particular embodiments, the embedded scintillator material is selected from at least one of the following materials (and Ce-doped versions thereof): $^6$Li-enriched $Cs_2LiYCl_6$ (CLYC), $^7$Li enriched $Cs_2LiYCl_6$ ($^7$CLYC), unenriched $Cs_2LiYCl_6$ (nat-CLYC), $Cs_2LiLaBr_6$ (CLLB), and $(CsLiLaBr_6)_{0.9}$ $(Cl_6)_{0.1}$ (CCLBC); Eu-doped $SrI_2$, $Cs_2HfCl_6$, $Cs_2HfBr_6$, $Cs_2HfCl_4Br_2$, $Cs_2HfCl_2Br_4$, Tl-doped NaI, Tl doped CsI, $^6$Li-doped glass, and an organic plastic.

In particular embodiments, the matrix material absorbs at least one of gamma rays and neutrons, and the matrix material emits photons in response to absorption of gamma rays or neutrons. In additional embodiments, the matrix material comprises an organic composition. In particular examples, the matrix material is a silicone-based composition or polyvinyltoluene.

Advantageously, the matrix material can have a spectral emission range that substantially matches a peak quantum efficiency of silicon photomultipliers (SiPMs). In additional embodiments, the matrix material has a spectral emission range that substantially matches a peak quantum efficiency of a photodetector (PMT, SiPM, SiAPD) configured to measure performance of the composite scintillator.

The pieces of the scintillator material can be dispersed through the matrix in or without a regular three-dimensional pattern. At least some of the surfaces of the embedded scintillator material can be smoothly polished; in additional embodiments, at least some of the surfaces of the embedded scintillator material are polished to a ground or matte surface finish. In still additional embodiments, the surface of the scintillator material is coupled with a light-collection device, and wherein other surfaces of the scintillator material are polished to a degree that increases internal reflection and are covered by a reflector 22. In particular embodiments, the composite scintillator has a substantially cylindrical shape or a tapered shape.

In additional embodiments, the embedded scintillator material, in response to absorbed gamma rays or neutrons, emits photons over a spectrum range that substantially overlaps an absorption wavelength range of the matrix material, and wherein the matrix material absorbs photons in the spectrum range of photons emitted by the scintillator material and re-emits photons at a wavelength higher than the spectrum range of photons emitted by the scintillator material.

A radiation detection system including the above-described composite scintillator can also include a photodetector configured to receive and detect photons emitted by the composite scintillator and a waveguide with two base surfaces at opposite ends of the waveguide. A first of the base surfaces of the waveguide can be coupled with the base surface of the composite scintillator, and a second of the base surfaces of the waveguide can be coupled with a photodetector. In particular embodiments, the first base surface of the waveguide has a base area that is substantially equal to the base surface of the composite scintillator has a base area, $S_1$; and the second base surfaces of the waveguide has a base area, $S_2$, wherein $S_2 < S_1$. In additional embodiments, the system is incorporated in a radiation portal monitor, and the composite scintillator is a plate.

A method for radiation detection includes absorbing gamma-ray or neutron radiation in pieces of at least one scintillator material embedded in a matrix material, together forming a composite scintillator. The scintillator material is (a) inorganic single-crystalline or ceramic, (b) organic plastic, or (c) glassy. The composite scintillator emits photons, and the emitted photons are detected with a photodetector. In particular embodiments, gamma rays and/or neutrons are absorbed in the matrix material, and photons are emitted from the matrix material in response to the absorption of gamma rays or neutrons. In additional embodiments, photons are emitted from the embedded scintillator material over a spectrum range that substantially overlaps an absorption wavelength range of the matrix material; those photons are absorbed in the matrix material and photons are re-emitted from the matrix material at a wavelength higher than the spectrum range of photons emitted by the scintillator material.

The composite scintillator can be used in stationary, mobile, man-portable, and laboratory radiation detectors.

Figure 1:
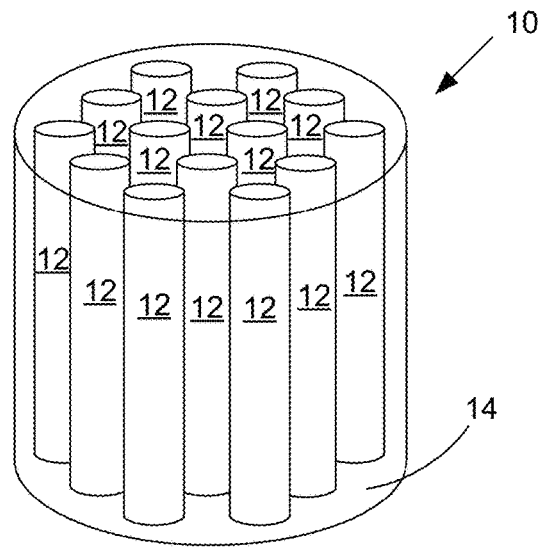
FIG. 1 is a schematic perspective drawing of a composite scintillator 10 comprising material A 12 embedded in material M 14.

In the accompanying drawings, like reference characters refer to the same or similar parts throughout the different views; and apostrophes are used to differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 5%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

The composite scintillator (CS) includes and may essentially consist of two or three different materials, M, A and/or B. Materials A and B are formed into various-sized pieces that may have any geometric shape, including right cylinders, prisms, disks, spheres, and irregularly shaped pieces as if formed from the crushing of a larger piece. Where the material A and/or B is a cylinder, the cylinder can have a diameter, e.g., in the range of 1-100 mm and a height from 1-100 mm. Materials A and/or B are contained (encapsulated) by M and may occupy, in total, a volume of 1% to 95% of the total composite volume. A cylindrical composite scintillator can have a diameter as small as 25 mm and can have a thickness in a wide range of, e.g., 5 mm to 2 m.

Figure 2:
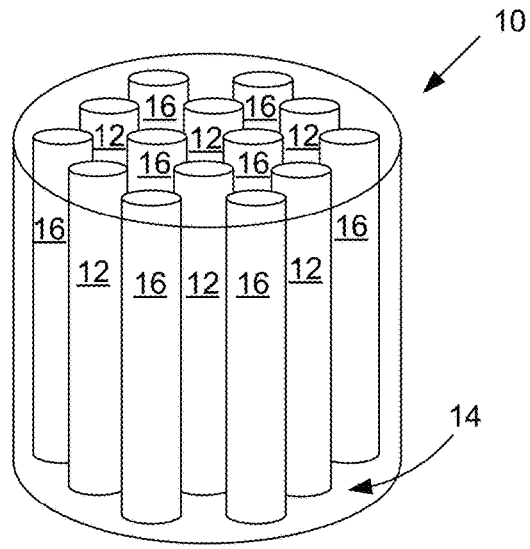
FIG. 2 is a schematic perspective drawing of a composite scintillator 10 comprising materials A 12 and B 16 embedded in material M 14.

One or more pieces of material A 12 and/or B 16 are contained in a volume of material M 14 to form a composite scintillator 10, as shown in FIGS. 1 and 2. In an embodiment, pieces of material A 12 and/or B 16 are encapsulated by material M 14; and there is no gap at the interfaces of volumes of materials A 12 and/or B 16 and M 14. In another embodiment, there may be a gap between material M 14 and the outer surfaces of volumes of materials A 12 and/or B 16, with the gap filled with an appropriately chosen gas or third material or with the gap kept under vacuum.

Material A and/or B is a single-crystal scintillator responsive to neutron and/or gamma-ray irradiation. Material A and/or B may be single crystals that are grown from the melt by the Bridgman, or Bridgman-Stockbarger, travelling zone, Czochralski, or Kyropolous methods; or from vapor by physical-vapor-transport or chemical-vapor-transport methods; or from solution by standard solution-crystal-growth techniques. Materials A and/or B may be a glassy material and may be formed by the hot-drawn process, rod-in-tube technique, melt spinning, or extrusion. Materials produced by any of the above techniques are cut to appropriate size and polished to the required surface finish.

Material A and/or B emits photons (i.e., scintillates) when it absorbs the neutron and/or gamma-ray radiation. Material A emits photons in the wavelength range of $\lambda_1$-$\lambda_2$, with peak emission at $\lambda_A$, as shown in plot 1 of FIGS. 3 and 4. Material B emits photons in the wavelength range of $\lambda_3$-$\lambda_4$, with peak emission, $\lambda_B$. When the photons generated from the interaction of material A and/or B with gamma radiation of a certain energy level (e.g., 662 keV characteristic of Cs-137) are collected by standard radiometry and spectrometry equipment, the response can be represented by a pulse-height spectrum with a well-defined photopeak centered at a position proportional to the energy with a distribution that can be characterized by its energy resolution (ER). FIG. 5 shows a typical response of a scintillator with a high ER (low numerical value) when subjected to irradiation by Cs-137 with a characteristic gamma-ray energy of 662 keV.

Figure 3:
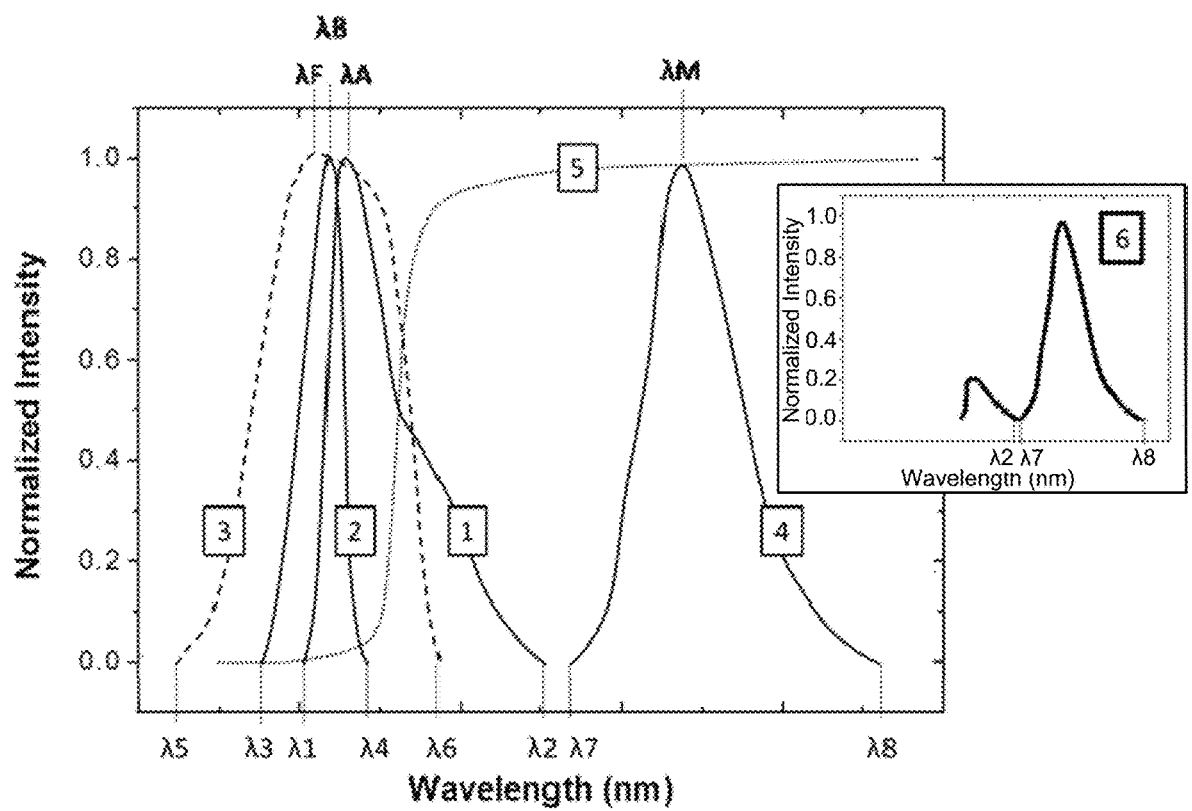
FIG. 3 presents schematic plots of the of the spectral emission and excitation spectra of the materials. Plot 1 represents the spectral emission of the scintillator material A 12, where emission occurs over the wavelength range of $\lambda_1$-$\lambda_2$ with a peak emission at $\lambda_A$. Plot 2 represents the spectral emission of the scintillator material B, where emission occurs over the wavelength range of $\lambda_3$-$\lambda_4$ with a peak emission at $\lambda_B$. Plot 3 represents the excitation (absorption) spectra of matrix M infused with a wavelength shifting component, which spans wavelengths $\lambda_5$-$\lambda_6$, with a peak absorption at $\lambda_F$. Plot 4 represents the spectral emission of matrix M in response to irradiation that occurs over a wavelength range of $\lambda_7$-$\lambda_8$, with a peak emission at $\lambda_M$. Plot 5 shows the spectral transmission of M, where the transmission is nearly zero at wavelengths less than $\lambda_8$ and rapidly rises to its max value of $\tau$. The spectral emission of the composite scintillator (CS) 10 is shown in plot 6 (inset) that overlaps the emission spectra of M and the wavelength range of photons emitted by A and/or B and not absorbed by M, and a certain portion of the energy of A that is not absorbed by the matrix and is directly transmitted through the matrix. The transmitted energy is shown as the small hump on the left side of plot 6. As drawn, the relative position of plots 1 through 6 are for illustrative purposes and are not intended to limit the claims of this invention.
Figure 4:
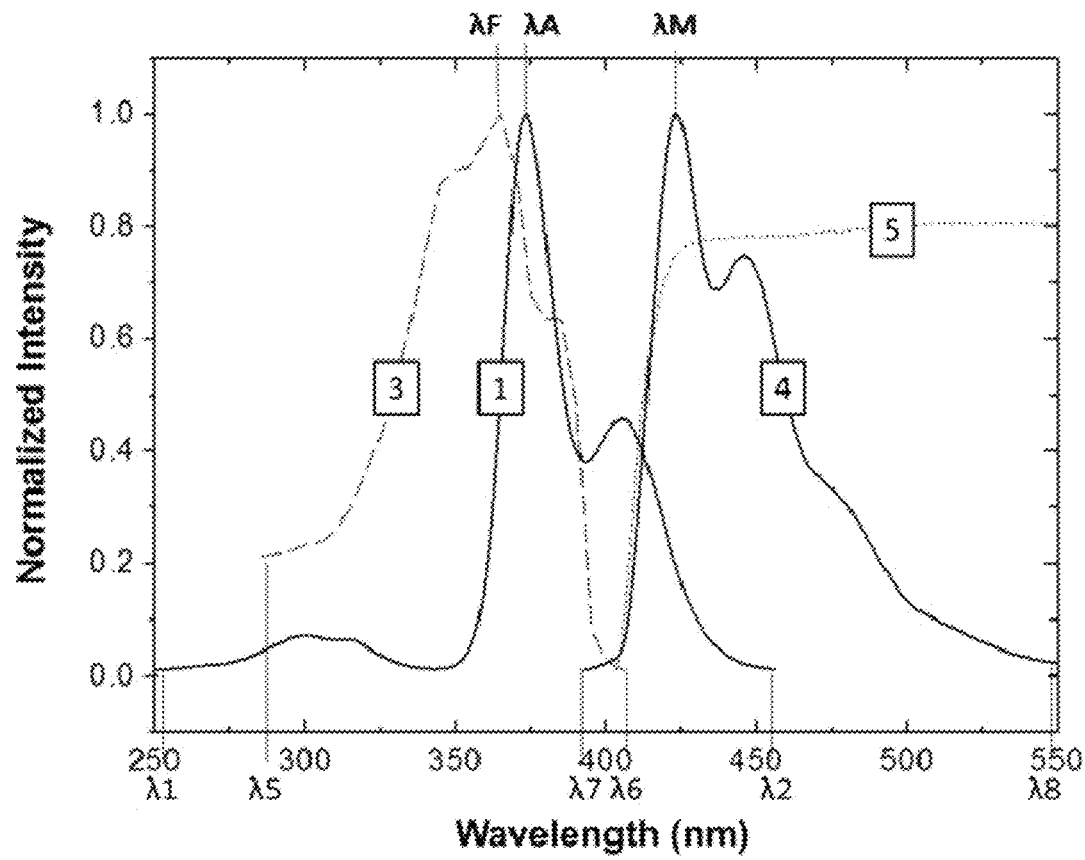
FIG. 4 shows the measured data that corresponds to the schematic drawing of FIG. 3. The spectral transmission of $Cs_2LiYCl_6$ (CLYC) is displayed as plot 1, which is a representation of the emission of materials A and/or B. The absorption spectra of polyvinyltoluene (PVT), EJ-290 scintillator from Eljen Technology of Sweetwater, Tex., USA is displayed as plot 3, which is a representation of the absorption spectrum of M. The transmission of the polyvinyltoluene (PVT), EJ-290 scintillator is displayed as plot 5, which is a representation of the spectral transmission of M; and the spectral transmission of a EJ-290 scintillator is displayed as plot 4, which is a representation of the emission of the matrix M.
Figure 5:
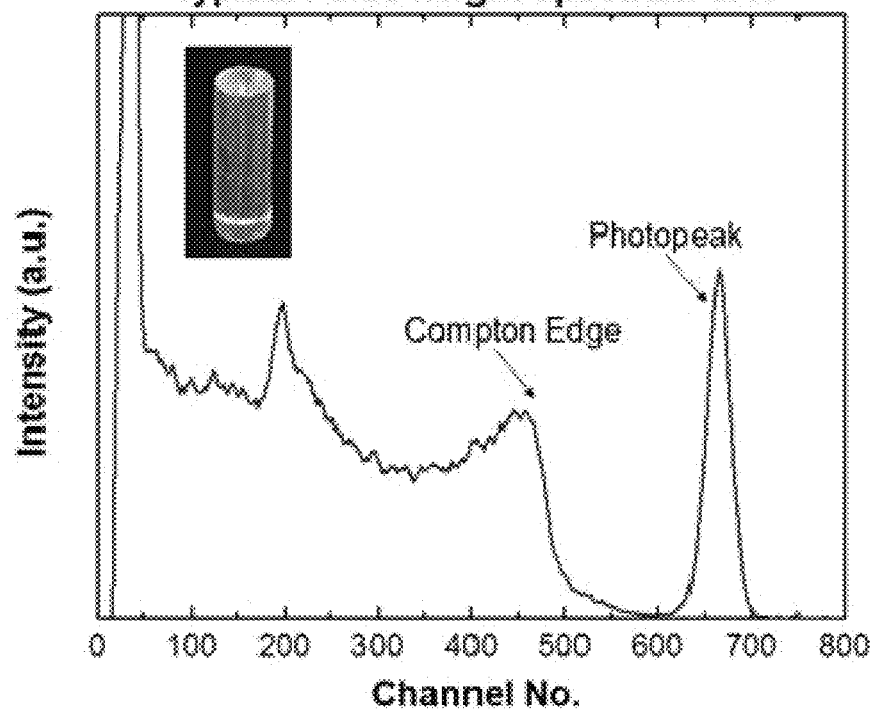
FIG. 5 is a plot showing the pulse-height spectrum of a typical single crystal (inset), A, responsive to gamma-ray irradiation from a Cesium-137 radioisotope.
Figure 6:
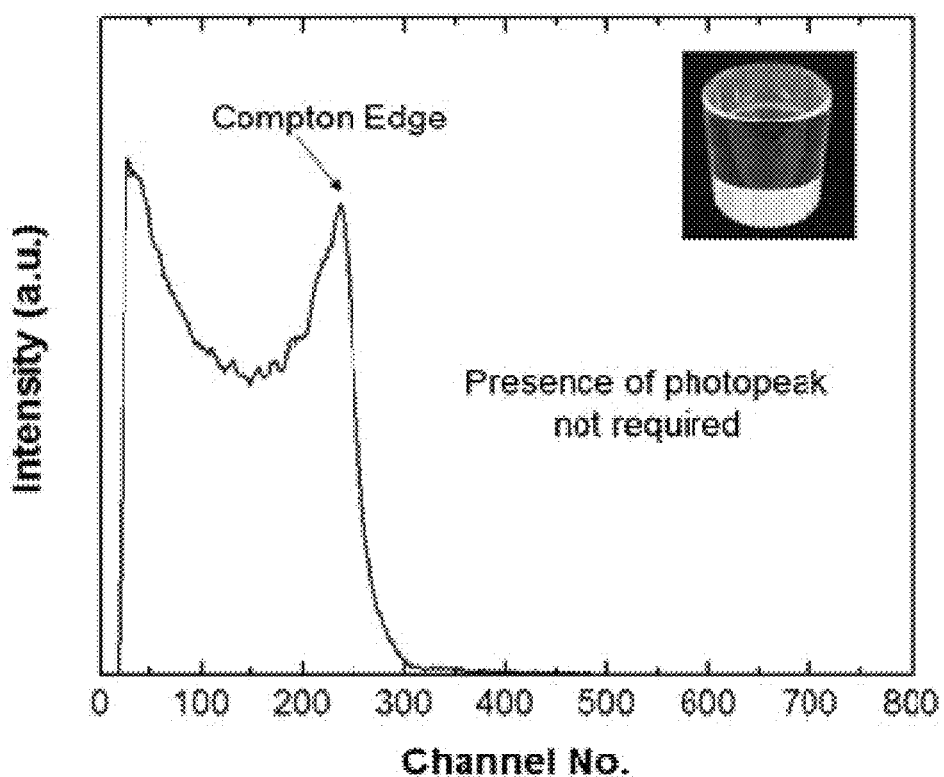
FIG. 6 is a plot of the pulse-height spectrum of a scintillating polyvinyltoluene (PVT), EJ-290 scintillator from Eljen Technology of Sweetwater, Tex., USA, in response to gamma-ray irradiation from a Cesium-137 radioisotope, wherein no photopeak is observed. A photo of the PVT sample is shown in the inset.

Material M may be an organic or silicone-based scintillator with an integrated flurophore that is responsive to gamma-ray and/or neutron irradiation, emitting over the wavelength range of $\lambda_7$-$\lambda_8$ (FIGS. 3 and 4, plot 4). The integrated flurophore also enables a process known as wavelength shifting (WLS): it absorbs photons at wavelengths in the range of $\lambda_5$-$\lambda_6$ (FIGS. 3 and 4, plot 3) and re-emits photons at longer wavelengths at $\lambda_7$-$\lambda_8$ (FIGS. 3 and 4, plot 4). Thus, in a composite scintillator comprising a class of A and/or B materials that emit within the M's absorption range of $\lambda_5$-$\lambda_6$ (FIGS. 3 and 4, plot 3), all or part of the emission by A and/or B are absorbed by M and re-emitted over M's emission range of $\lambda_7$-$\lambda_8$ (FIGS. 3 and 4, plot 4). FIG. 4 shows the phenomenon described above by the measured values of a representative system. The measured spectral transmission of CLYC (representative of A and/or B) is shown to partially overlap the absorption spectrum of a polyvinyltoluene (PVT), EJ-290 scintillator from Eljen Technology of Sweetwater, Tex., used as the matrix M; and the transmission spectrum of the EJ-290 allows for transmission of the entire spectrum of energy emitted by CLYC. The emission of the composite scintillator, as shown and characterized in FIGS. 7-9, consists of the re-emission of the energy directly emitted by EJ-290 scintillator, energy emitted by the CLYC crystals and absorbed and re-emitted by EJ-290 scintillator, and energy emitted by the CLYC crystals that is not absorbed by the EJ-290 scintillator and that is directly transmitted through it. The energy emitted by the CLYC crystals and transmitted through the EJ-290 scintillator appears as the shoulder on the left-hand side of plot 4 in FIG. 4.

The performance of the composite scintillator, as described above, imposes limitations on the selection of materials for A and/or B and matrix M. First, the spectral emission of A and/or B must partially or totally overlap the absorption spectrum of matrix M. For efficient performance of the composite scintillator, it is advantageous that 50-100% of the energy emitted by A and/or B is absorbed by M. The second requirement is that the energy absorbed by M is re-emitted, by the so-called wavelength shifting phenomenon, at wavelengths longer than those emitted by A and/or B. That is, the peak emission wavelength of M, $\lambda_M$ in FIG. 3, should be longer than the peak emission wavelengths of A and/or B, $\lambda_A$ and $\lambda_B$ in FIG. 3. It is advantageous that the spectral transmittance of M be high in the wavelength range beyond the overlap range of emission of A and/or B and absorption of M, to allow direct transmission of energy emitted by A and/or B but not absorbed by M, preferably exceeding 50%. It is advantageous that the index of refraction of A and M should be close to each other so as to reduce the fraction of photons emanating from A that are reflected back into A at the interface of A and M. The same applies to B and M. Reduction of internal reflection back into A and B decreases the total number of reflections that the photons experience before they leave A and/or B, respectively. As every reflection at interfaces of A and/or B and M is associated with a probability of absorption and/or scattering of the photons, a reduction in the number of internal reflections can ensure that a higher fraction of the photons generated in A and/or B leave the composite scintillator. The material constraints, described above, ensure that some or all of the energy of photons generated by A and/or B in response to irradiation are captured by the light-sensing device attached to the composite scintillator for light collection.

The energy resolution (ER) and the figure of merit (FOM, as described earlier) of the composite scintillator formed of materials A and/or B and M is influenced by the geometry and volume fraction of A and/or B. In general, shapes with high ratios of volume to surface area are preferred as they offer lower probability of absorption and scattering of light at the interfaces of A and/or B and M. Thus, regular-shaped cylinders or spheres are advantageous over crushed pieces. The ER of the composite scintillator is a function of the volume of A and/or B in the composite. The ER increases with an increasing volume fraction of A and/or B from zero up to a specific volume fraction, hereafter referred to as $\varepsilon_{max}$, beyond which, it stays constant. The value of $\varepsilon_{max}$ is determined by the properties of A and/or B and M, the size and shape of A and/or B, and the size of the composite scintillator. For the composite scintillator 10 of FIG. 7, the value of $\varepsilon_{max}$ is 18%.

In cases where the matrix M 14 has an organic composition, the composite scintillator 10 is fabricated by first casting a base layer of matrix M 14 at the bottom of a mold, which can be, for example, cylindrical. After the base layer has cured to the extent that it is mildly hardened and able to support the crystals, the crystals of material A 12 and/or B 16 are placed on top of the base layer. Once the base layer is hardened and the crystals 12/16 are rigidly attached to the base layer, the uncured plastic (material M 14) is poured into the mold to cover the base and the crystals 12/16, to a height that extends over the top of the crystals 12/16, and then cured. In the case in which crushed crystals of material A 12 and/or B 16 are used, the total volume of the material M 14 may be slightly cured to increase its viscosity, the crushed material dispersed and embedded within the volume, and then the entire composite 10 fully cured. In the case that material M 14 is already in a solid piece, holes may be bored or machined, crystals of material A 12 and/or B 16 embedded, and the open volume sealed. In the cases where material M 14 is not a plastic, then a similar procedure with respect to the placement and encapsulation of the crystals 12/16 is followed.

The wavelength shifting process that occurs in a composite scintillator is advantageous when the shifted emission brings the emitted photons to wavelengths where photodetectors, such as photo-multiplier tubes (PMT), silicon photomultipliers (SiPMs), or silicon avalanche photodiodes (SiAPDs) have their greatest quantum efficiency. Most standard bialkali or superbialkali PMTs are sensitive in the range of 200 to 700 nm, with maximum quantum efficiency occurring in the range 350 to 430 nm. Likewise, SiPMs such as the J-type from SenSL Technologies Ltd. of Cork, Ireland, are sensitive in the range of 200 to 900 nm, with peak quantum efficiency occurring at 420 nm. The quantum efficiency of SiAPDs is highest in the range of 500-800 nm.

The shift in the wavelength of peak emission towards the more-sensitive wavelength range of the photodetector results in a higher measured light yield and a better energy resolution (i.e., a lower numerical value of ER). Thus, a wavelength shift towards 350-430 nm is advantageous when PMTs or SiPMs are being used, and a shift towards the 500-800 nm range is advantageous when APDs are used. The better matched the peak emission wavelength of the composite scintillator is to the peak in the quantum efficiency of the photodetector, the better the response will be in terms of light yield and energy resolution recorded. Thus, an advantageous feature of material M is its ability to shift a material's spectral emission distribution to wavelengths that better overlap with wavelengths corresponding to the maximum quantum efficiency of the selected photodetector.

Figure 7:
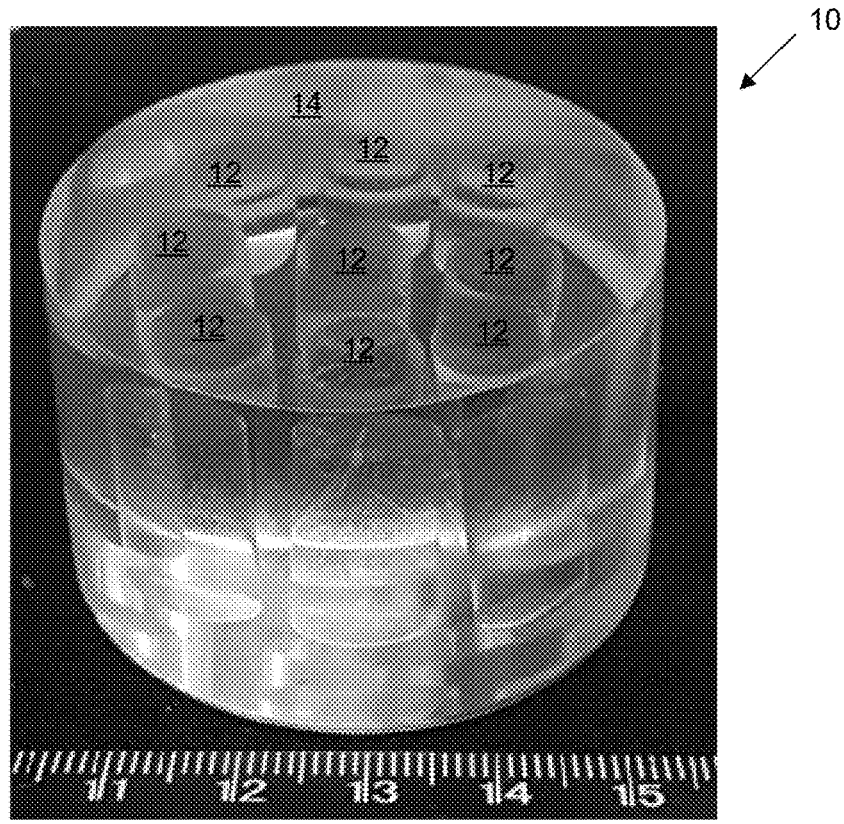
FIG. 7 is a photographic image of a composite scintillator comprising nine 9-mm-diameter-×-19-mm-long single crystals of CLYC embedded in 49-mm diameter-×-33-mm-long EJ-290 PVT scintillating plastic as the matrix material.
Figure 8:
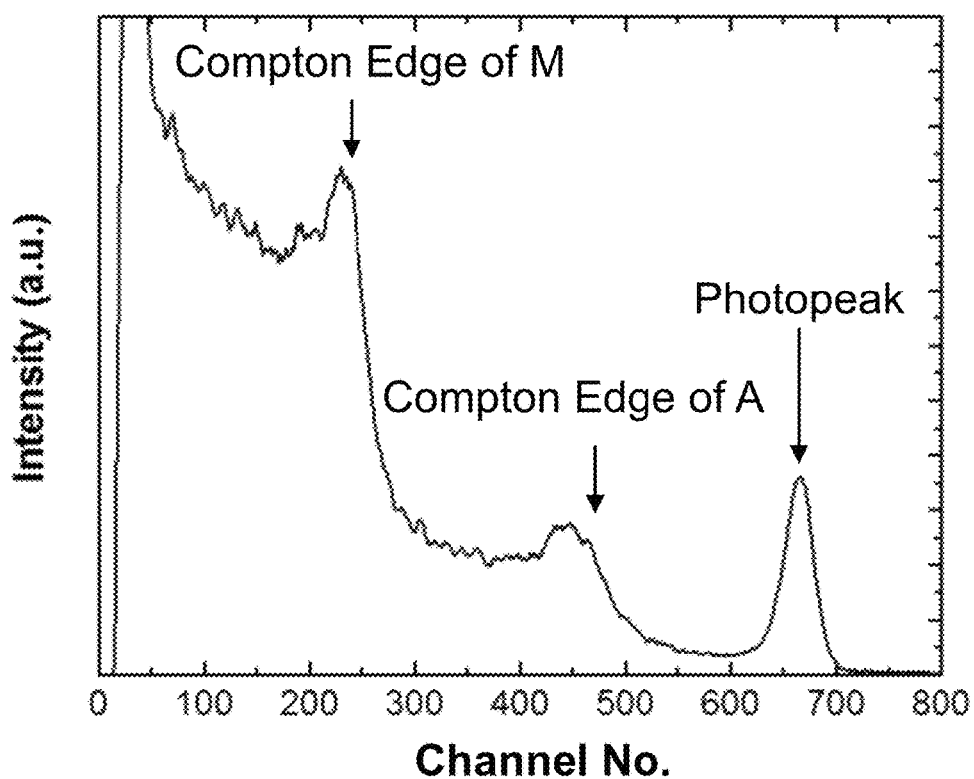
FIG. 8 is a plot showing the pulse-height spectrum with the measured light yield and energy resolution of the CLYC-PVT composite scintillator shown in FIG. 7.
Figure 9:
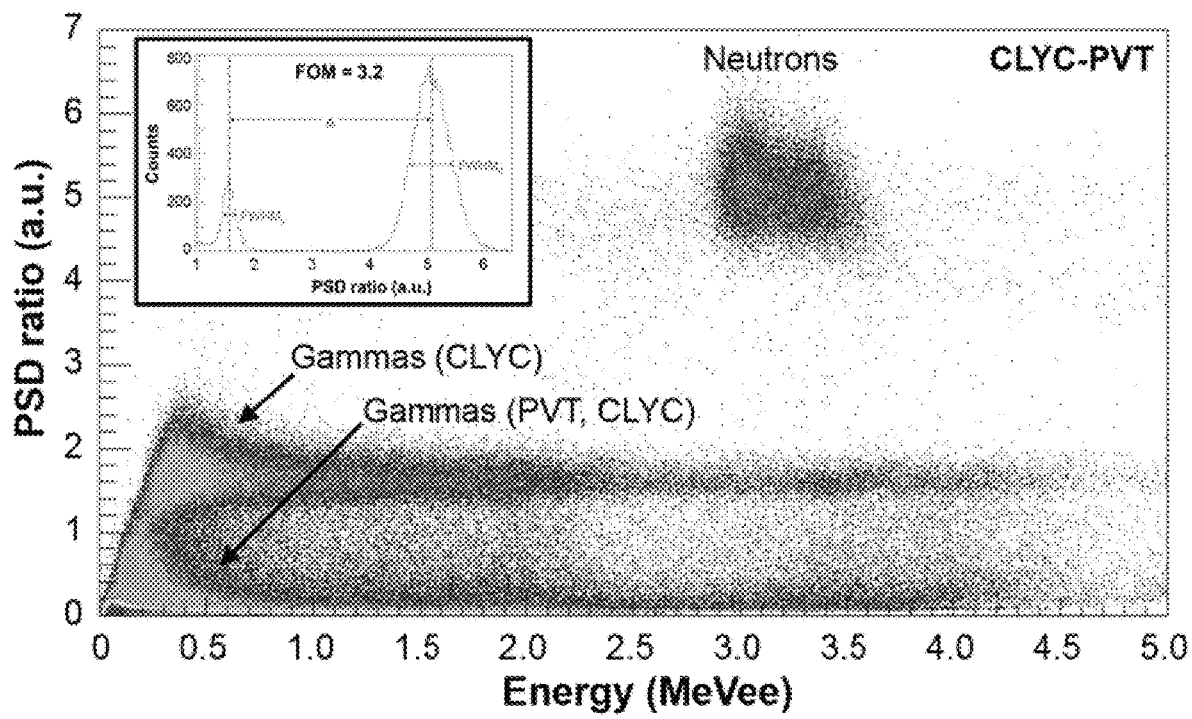
FIG. 9 is a plot showing the pulse-shape discrimination ratio between the detected gamma radiation and neutrons with the measured figure of merit (FOM) value.

FIG. 7 shows a composite scintillator 10 fabricated from nine cylinders of 9-mm-diameter-×-19-mm-long single crystals of CLYC scintillator (material A) 12 embedded in 49-mm-diameter-×-33-mm-long scintillating PVT matrix (material M) 14. The optical properties of the CLYC and PVT, including the emission spectrum of CLYC (line 1); the absorption spectrum of scintillating PVT (line 3), the emission spectrum of EJ-290 PVT (line 4); and the spectral transmission of scintillating PVT (line 5) are shown in FIG. 3. The spectral behavior of CLYC (line 1) and EJ-290 scintillating PVT (lines 3-5) are shown in FIG. 4 and satisfy the requirements described earlier. The emission peak of EJ-290 PVT (line 4) is in the 420-430 nm range, which matches the peak quantum efficiency of bialkali and superbialkali PMTs and SiPMs. The CLYC cylinders had light yields that ranged from 17,300 to 18,200 ph/MeV and energy resolutions that ranged from 3.4-4.5%. FIG. 8 shows the pulse-height spectrum of the CLYC-PVT composite scintillator, which is characterized by a photopeak and Compton edge corresponding to radiation interactions with material A 12, and a Compton edge corresponding to radiation interactions with material M 14. FIG. 9 shows the pulse shape discrimination between the detected gamma rays and neutrons with the calculated figure of merit (FOM) value. The performance of the composite scintillator—a light yield of 18,100 ph/MeV, an energy resolution of 4.4% and figure of merit of 3.2—matches the typical performance of standalone CLYC single crystals. These properties would not be obtainable if the encapsulating material was not a scintillating plastic with the restrictions on its spectral emission as given in the above paragraphs.

Figure 10:
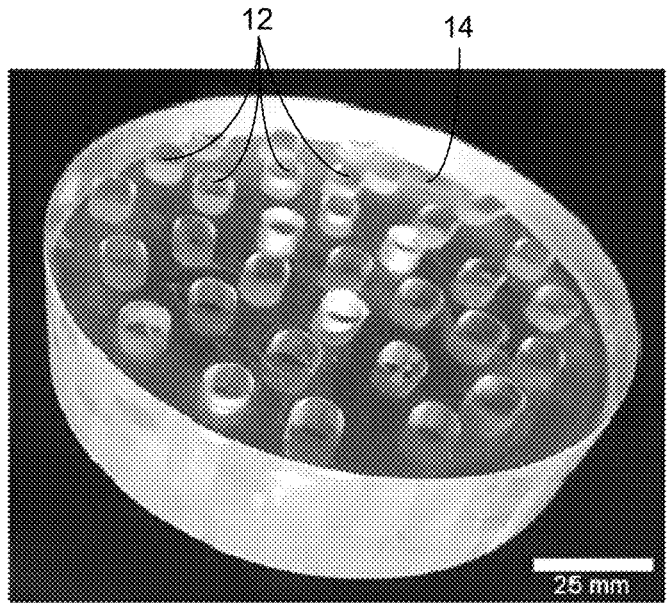
FIG. 10 is a photographic image of a composite scintillator comprising 31 single crystals of CLYC embedded in 127-mm-diameter-x-30-mm-long EJ-290 PVT scintillating plastic as the matrix material.
Figure 11:
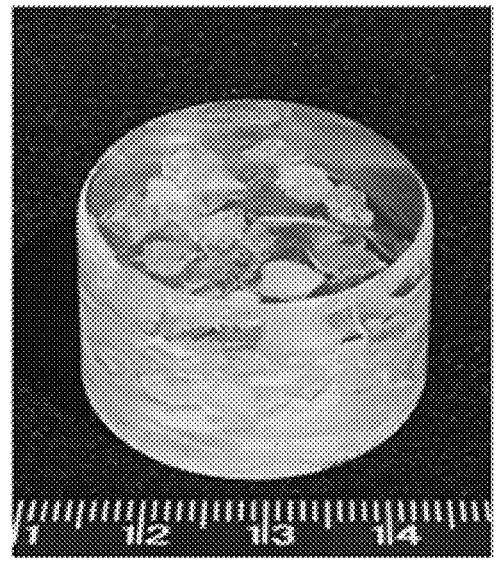
FIGS. 11 and 12 are photographic images of a composite scintillator comprising crushed single crystals of CLYC embedded in a 30-mm-diameter-x-17-mm-long EJ-290 PVT scintillating plastic as the matrix material (FIG. 11) and in a 30-mm-diameter-x-25-mm-long EJ-290 PVT non-scintillating plastic as the matrix material (FIG. 12).
Figure 12:
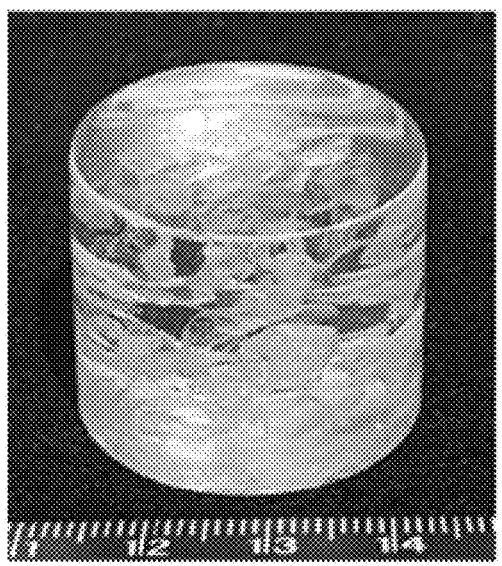

FIGS. 10-12 show other CLYC-PVT composite geometries. FIG. 10 shows a composite scintillator comprising 31 single crystals of CLYC scintillator 12 embedded in a 127-mm-diameter-×-30-mm-long scintillating PVT plastic matrix 14. FIGS. 11 and 12 show a composite scintillator comprising crushed single crystals of CLYC scintillator 12 embedded (A) in 30-mm-diameter-×-17-mm-long scintillating PVT plastic 14 (FIG. 11) and (B) in 30-mm-diameter-×-25-mm-long non-scintillating PVT plastic 14 (FIG. 12).

Figure 13:
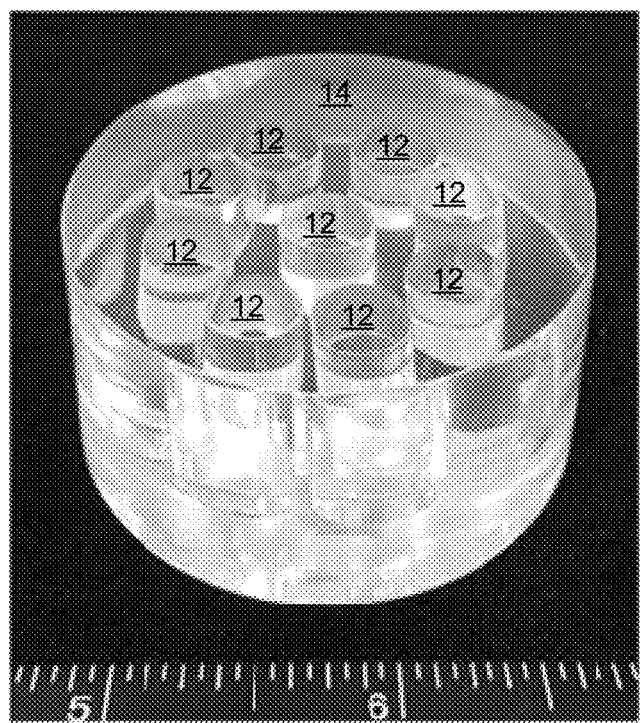
FIG. 13 is a photographic image of a composite scintillator comprising 9 single crystal rods of Eu-doped strontium iodide ($SrI_2(Eu)$) embedded in a matrix material embedded in 50-mm-diameter-x-25-mm-long EJ-290 PVT scintillating plastic.

FIG. 13 shows a composite scintillator comprising nine 9-mm-diameter-×-15-mm-long single crystal rods of Eu-doped strontium iodide ($SrI_2(Eu)$) 12 embedded in 50-mm-diameter-×-25-mm-long scintillating PVT (EJ-290) scintillating plastic 14. SrI2(Eu) is sensitive to gamma-ray radiation only. The $SrI_2(Eu)$ cylinders 12 had light yields that ranged from 83,600 to 87,700 ph/MeV and energy resolutions that ranged from 2.9 to 3.2%. The composite had a light yield of 92,000 ph/MeV and an energy resolution of 3.6%, which matches the typical performance of standalone $SrI_2(Eu)$ single crystals. The spectral behavior of $SrI_2(Eu)$ 12 and EJ-290 scintillating PVT matrix 14 obey the materials requirements described above: a large fraction of the light emitted by $SrI_2(Eu)$ is absorbed by EJ-290 PVT and re-emitted at higher wavelengths.

In particular embodiments, a composite scintillator is formed from pieces of single-crystal A 12 and matrix M 14, where crystal A 12 can be any scintillator crystal responsive to gamma-ray and neutron irradiation, including but not restricted to the following Ce-doped compositions: $^6$Li-enriched $Cs_2LiYCl_6$ (CLYC), $^7$Li-enriched $Cs_2LiYCl_6$ ($^7$CLYC), $Cs_2LiYCl_6$ without Li-enrichment (nat-CLYC), $Cs_2LiLaBr_6$ (CLLB), and $(CsLiLaBr_6)_{0.9}(Cl_6)_{0.1}$ (CLLBC).

In particular embodiments, a composite scintillator is formed from pieces of single crystal A 12 and matrix M 14, where crystal A 12 can be any scintillator crystal responsive only to gamma-ray irradiation, including but not restricted to NaI(Tl), CsI(Tl), $Cs_2HfCl_6$, and $SrI_2(Eu)$.

In particular embodiments, a composite scintillator is formed from pieces of single crystals A 12 and/or B 16 and matrix M 14, where crystal A 12 can be any scintillator crystal responsive to gamma-ray and neutron irradiation, and crystal B 16 can be any scintillator crystal responsive to gamma-ray irradiation.

In particular embodiments, a composite scintillator is formed from pieces of crystal A 12 and/or crystal B 16 and matrix M 14, where crystal A 12 can be any scintillator crystal responsive to gamma-ray irradiation, and where crystal B 16 can be any scintillator crystal or doped glass responsive to neutron irradiation, such as $^6$Li-doped glass.

In particular embodiments, a composite scintillator is formed from pieces of single crystal A 12 and/or B 16 and matrix M 14, where crystals A 12 and/or B 16 are responsive to gamma-ray and/or neutron radiation, and where matrix M 14 is any material that absorbs gamma rays and/or neutrons and emits photons, such as PVT (e.g., EJ-290) or $^6$Li-loaded plastic (EJ-270).

In particular embodiments, a composite scintillator is formed from pieces of single crystal A 12 and/or B 16 and matrix M 14, where crystals A 12 and/or B 16 are responsive to gamma-ray and/or neutron radiation, and where matrix M 14 is any material that absorbs neutron irradiation and emits photons.

In particular embodiments, a composite scintillator is formed from pieces of single crystal A 12 and matrix M 14, where matrix M 14 is an organic scintillator, such as PVT (e.g., EJ-290 PVT).

In particular embodiments, a composite scintillator is formed from pieces of single crystal A 12 and matrix M 14, where matrix M 14 is a silicone-based material.

In particular embodiments, a composite scintillator is formed from pieces of crystal A 12 and/or B 16 embedded in matrix M 14 and is coupled to a light guide made of matrix M.

In particular embodiments, the spectral emission of matrix M 14 is in the range that matches the peak quantum efficiency of bialkali or superbialkali photomultiplier tubes (PMTS).

In particular embodiments, the spectral emission of matrix M 14 is in the range that matches (or substantially matches) the peak quantum efficiency of silicon photomultipliers (SiPMs).

In particular embodiments, the spectral emission of matrix M 14 is in the range that matches (or substantially matches) the peak quantum efficiency of silicon avalanche photodiodes (SiAPDs).

In particular embodiments, the spectral emission of matrix M 14 is in the range that matches (or substantially matches) the peak quantum efficiency of the photodetector used to measure the performance of the composite scintillator.

In particular embodiments, a composite scintillator is fabricated with pieces of crystal A 12 and/or B 16 placed in matrix M 14 in a regular pattern in three dimensions.

In particular embodiments, a composite scintillator is fabricated with pieces of crystal A 12 placed in matrix M 14 without any regular pattern.

In particular embodiments, all or some of the surfaces of crystal A 12 volumes are polished to a very smooth surface prior to placement into matrix M 14.

In particular embodiments, all or some of the surfaces of crystal A 12 volumes are polished to a ground or matte surface prior to placement into matrix M 14.

In particular embodiments, all of the surfaces of the composite scintillator, except for the surface coupled to the light-collection device, are polished to a matte finish to increase internal reflection and are covered by a reflector 22.

In particular embodiments, the composite scintillator is cylindrical.

In particular embodiments, a composite scintillator is formed from pieces of material A 12 and/or B 16 embedded in matrix M 14, where matrix M 14 has a tapered shape, such as a frustrum.

Figure 14:
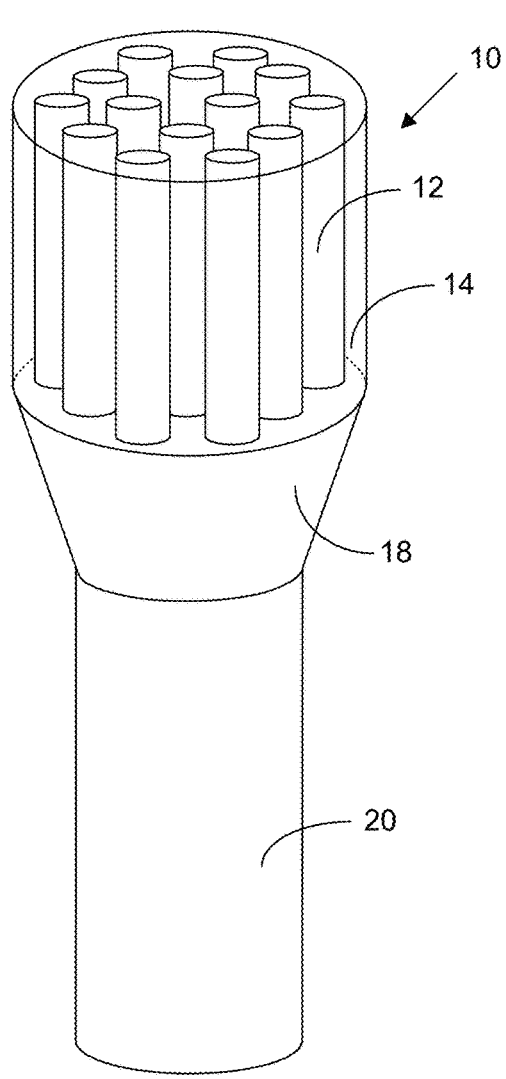
FIG. 14 is a radiation detection system, including a composite scintillator 10, a photodetector (in the form of photomultiplier tubes) 20, and a waveguide 18.
Figure 17:
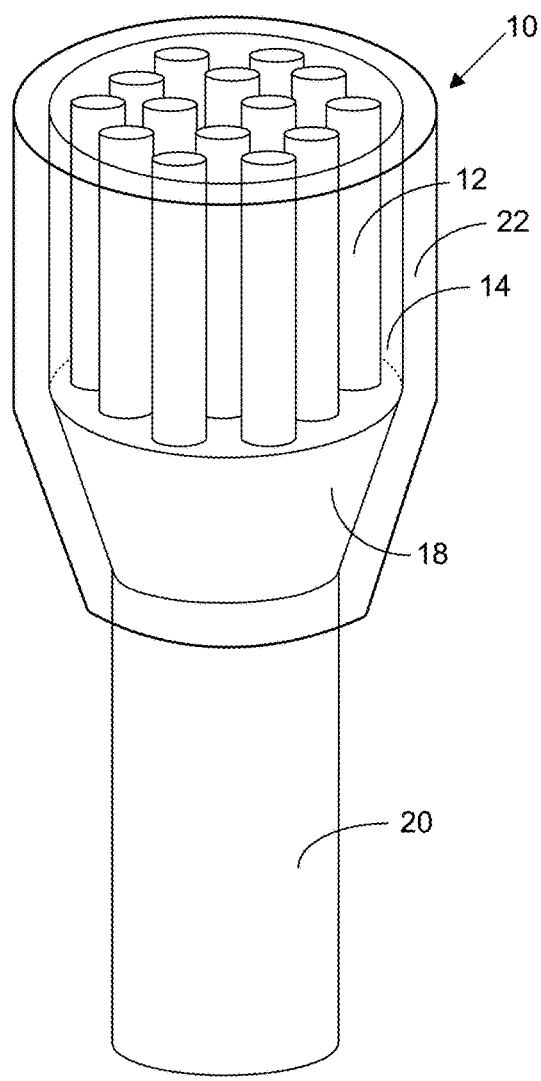
FIG. 17 shows a the radiation detection system of FIG. 14 but surfaces covered by a reflector 22 in this embodiment.
Figure 15:
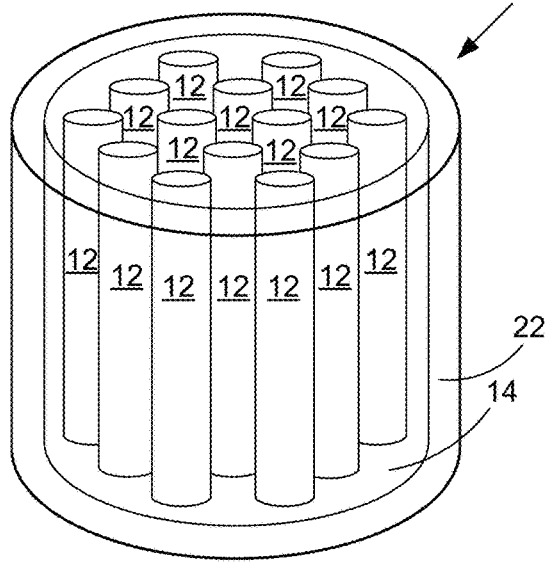
FIGS. 15 and 16 are schematic perspective drawings, respectively, of the composite scintillators 10 of FIGS. 1 and 2 but with surfaces covered by a reflector 22 in these embodiments.
Figure 16:
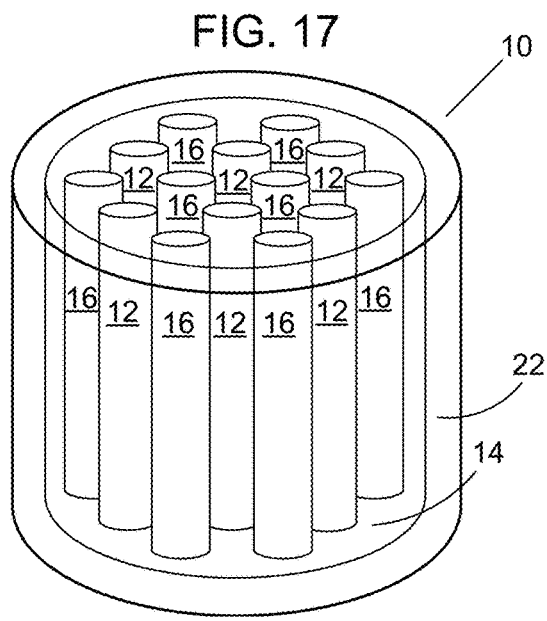

In particular embodiments, as shown in FIG. 14, the composite scintillator 10 has a base area, $S_1$, and is attached to a waveguide 18 with two different circular base surfaces, $S_1$ and $S_2$, where $S_2 < S_1$; and the waveguide surface, $S_2$, is used to couple the ensemble of the composite scintillator 10 and the waveguide 18 to a photodetector 20 (in the form of photomulitplier tubes in the embodiment of FIG. 14) with an area close to (e.g., within 10%) or equal to $S_2$.

In particular embodiments, the composite scintillator 10 is a plate with dimensions suitable for use in radiation portal monitors.

A system that includes (a) a composite scintillator 10 comprising matrix M 14 and crystals A 12 and/or B 16, and (b) a photo-detection element is disclosed, where the spectral emission of crystal A 12 and matrix M 16 obey the relationship $\lambda_A$ and/or $\lambda_B <$ or close to $\lambda_M$ and certainly $< \lambda_6$; $\lambda_3 < \lambda_5$; $\lambda_4 < \lambda_6$, $\tau \geq 60\%$, and the emission spectrum of matrix M 14 overlaps with the wavelength range of the high-quantum-efficiency range of the photo-detection element.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A composite scintillator, comprising:
   a matrix material; and
   pieces of at least one scintillator material embedded in the matrix material, wherein the scintillator material is (a) inorganic single-crystalline, (b) ceramic, (c) organic plastic, or (d) glassy, and is substantially cylindrical or tapered in shape with dimensions of at least 5 mm, and wherein the embedded scintillator material scintillates photons in response to at least one of gamma-ray and neutron irradiation,
   wherein the matrix material is a material that absorbs photons emitted by the embedded pieces of scintillator material and re-emits photons at a wavelength longer than the wavelength of photons emitted by the embedded pieces of scintillator material, wherein the matrix material also absorbs at least one of gamma rays and neutrons, wherein the matrix material emits photons in response to absorption of gamma rays or neutrons, and wherein the matrix material has a spectral emission range with an integrated area under the emission spectrum that overlaps an integrated area under a quantum efficiency curve of a photodetector configured to measure performance of the composite scintillator, wherein the photodetector is selected from a photomultiplier tube, a silicon photomultiplier, and a silicon avalanche photodiode, and wherein the overlap meets or exceeds 33% of the integrated area under the emission spectrum.

2. The composite scintillator of claim 1, wherein the embedded scintillator material is selected from at least one of the following materials, including Ce-doped compositions: $^6$Li-enriched $Cs_2LiYCl_6$ (CLYC), $^7$Li-enriched $Cs_2LiYCl_6$ ($^7$CLYC), unenriched $Cs_2LiYCl_6$ (nat-CLYC), $Cs_2LiLaBr_6$ (CLLB), $(CsLiLaBr_6)_{0.9}(Cl_6)_{0.1}$ (CLLBC), Eu-doped $SrI_2$, $Cs_2HfCl_6$, $Cs_2HfBr_6$, $Cs_2HfCl_4Br_2$, $Cs_2HfCl_2Br_4$, Tl-doped NaI, Tl-doped CsI, $^6$Li-doped glass, and an organic plastic.

3. The composite scintillator of claim 1, wherein the matrix material comprises an organic composition.

4. The composite scintillator of claim 3, wherein the organic composition is polyvinyltoluene with functionalized fluorophores that are excitable by at least one of gamma and neutron radiation.

5. The composite scintillator of claim 1, wherein the matrix material comprises a silicone-based composition with functionalized fluorophores that are excitable by at least one of gamma and neutron radiation.

6. The composite scintillator of claim 1, wherein the pieces of the scintillator material are dispersed through the matrix in a regular three-dimensional pattern.

7. The composite scintillator of claim 1, wherein the pieces of the scintillator material are dispersed through the matrix without a regular three-dimensional pattern.

8. The composite scintillator of claim 1, wherein at least some of the surfaces of the embedded scintillator material are smoothly polished.

9. The composite scintillator of claim 1, wherein at least some of the surfaces of the embedded scintillator material are polished to a ground or matte surface finish.

10. The composite scintillator of claim 1, wherein one surface of the composite scintillator is coupled with a light-collection device, and wherein other surfaces of the composite scintillator are polished to a degree that increases internal reflection and are covered by a reflector.

11. The composite scintillator of claim 1, wherein the composite scintillator has a substantially cylindrical shape.

12. The composite scintillator of claim 1, wherein the composite scintillator has a tapered shape.

13. The composite scintillator of claim 1, wherein the matrix material is a material that absorbs at least 50% of photons emitted by the pieces of scintillator material.

14. A radiation detection system, comprising:
a composite scintillator, comprising a matrix material and pieces of at least one scintillator material embedded in the matrix material, wherein the scintillator material is (a) inorganic single-crystalline, (b) ceramic, (c) organic plastic, or (d) glassy, and is substantially cylindrical or tapered in shape with dimensions of at least 5 mm, and wherein the embedded scintillator material scintillates photons in response to at least one of gamma-ray and neutron irradiation, wherein the composite scintillator has a base surface, and wherein the matrix material is a material that absorbs photons emitted by the embedded pieces of scintillator material and re-emits photons at a wavelength longer than the wavelength of photons emitted by the embedded pieces of scintillator material, wherein the matrix material also absorbs at least one of gamma rays and neutrons, and wherein the matrix material emits photons in response to absorption of gamma rays or neutrons;

a photodetector configured to receive and detect photons emitted by the composite scintillator, wherein the matrix material has a spectral emission range with an integrated area under the emission spectrum that overlaps an integrated area under a quantum efficiency curve of the photodetector, wherein the photodetector is selected from a photomultiplier tube, a silicon photomultiplier, and a silicon avalanche photodiode, and wherein the overlap meets or exceeds 33% of the integrated area under the emission spectrum; and a waveguide with two base surfaces at opposite ends of the waveguide, wherein a first of the base surfaces of the waveguide is coupled with the base surface of the composite scintillator, and wherein a second of the base surfaces of the waveguide is coupled with a photodetector.

15. The radiation detection system of claim 14, wherein the base surface of the composite scintillator has a base area, $S_1$, wherein the first base surface of the waveguide has a base area that is substantially equal to $S_1$, and wherein the second base surfaces of the waveguide has a base area, $S_2$, wherein $S_2<S_1$.

16. The radiation detection system of claim 14, wherein the system is incorporated in a radiation portal monitor, and wherein the composite scintillator is a plate.

17. A method for radiation detection, comprising:
absorbing gamma-ray or neutron radiation in pieces of at least one scintillator material embedded in a matrix material, wherein the matrix material and the scintillator together form a composite scintillator, and wherein the scintillator material is (a) inorganic single-crystalline, (b) ceramic, (c) organic plastic, or (d) glassy, and is substantially cylindrical or tapered in shape with dimensions of at least 5 mm;

emitting photons from the pieces of scintillator material in response to the absorption of gamma-ray or neutron radiation;

absorbing in the matrix material the photons emitted from the pieces of scintillator material;

re-emitting photons from the matrix material at a wavelength longer than the wavelength of photons emitted by the embedded pieces of scintillator;

absorbing in the matrix material at least one of gamma rays and neutrons and emitting photons in response to the absorption of the at least one of gamma rays and neutrons; and detecting the photons from the matrix material with a photodetector, wherein the matrix material has a spectral emission range with an integrated area under the emission spectrum that overlaps an integrated area under a quantum efficiency curve of the photodetector, wherein the photodetector is selected from a photomultiplier tube, a silicon photomultiplier, and a silicon avalanche photodiode, and wherein the overlap meets or exceeds 33% of the integrated area under the emission spectrum.

18. The method of claim 17, further comprising:
absorbing at least one of gamma rays and neutrons in the matrix material; and
emitting photons from the matrix material in response to the absorption of gamma rays or neutrons.

19. The method of claim 17, wherein the matrix material absorbs at least 50% of photons emitted by the pieces of scintillator material.

* * * * *